W. H. MURSCH.
CLUTCH.
APPLICATION FILED JUNE 26, 1914.
1,134,283.
Patented Apr. 6, 1915.
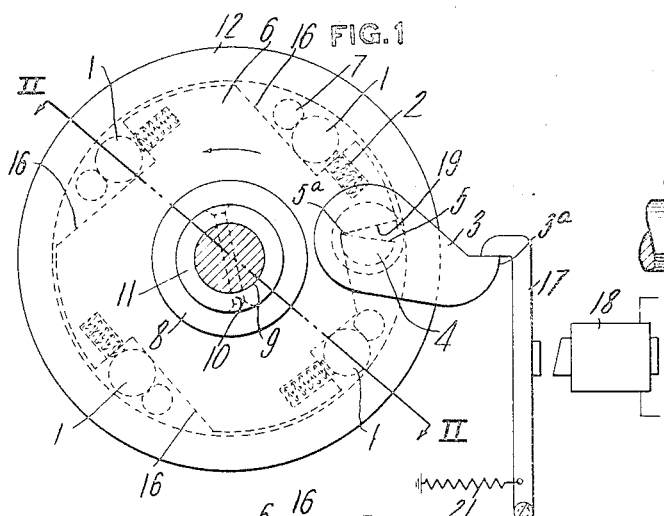
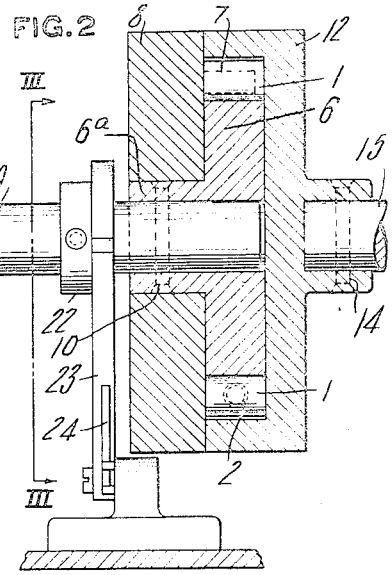
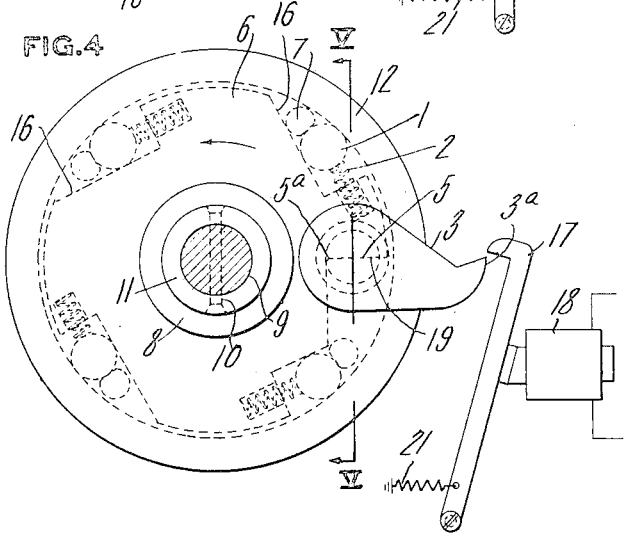
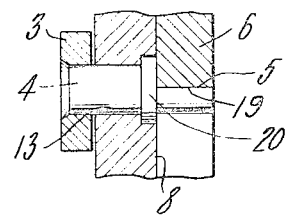
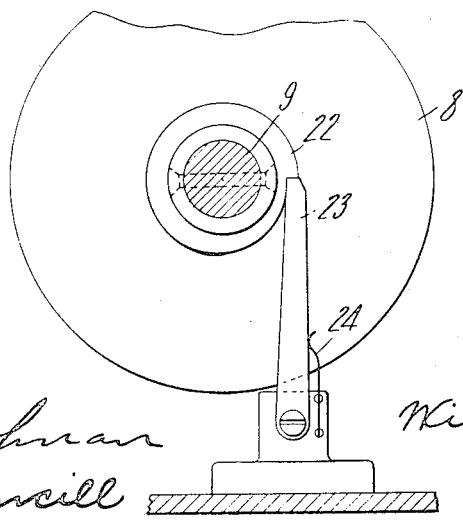
WITNESSES
INVENTOR
William H. Mursch

UNITED STATES PATENT OFFICE.

WILLIAM H. MURSCH, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

CLUTCH.

1,134,283.

Specification of Letters Patent.

Patented Apr. 6, 1915.

Application filed June 26, 1914. Serial No. 847,402.

*To all whom it may concern:*

Be it known that I, WILLIAM H. MURSCH, a citizen of the United States, residing at Swissvale, in the county of Allegheny and State of Pennsylvania, have invented certain new and useful Improvements in Clutches, of which the following is a specification.

My invention relates to clutches.

Clutches embodying my invention are especially well adapted for use in printing telegraph apparatus, although they are not limited to this particular adaptation.

I will describe one form of clutch embodying my invention and will then point out the novel features thereof in claims.

In the accompanying drawings, Figure 1 is a view showing one form of clutch embodying my invention, the parts being shown in the disengaging position. Fig. 2 is a sectional view on the line II—II of Fig. 1, looking in the direction of the arrows. Fig. 3 is a view on the line III—III of Fig. 2. Fig. 4 is a view similar to Fig. 1, but showing the parts of the clutch in the engaging position. Fig. 5 is a sectional view on the line V—V of Fig. 4, looking in the direction of the arrows.

Similar reference characters refer to similar parts in each of the views.

Referring first to Figs. 1 and 2, the clutch comprises a drum or shell 12, which is rigidly secured to a rotatable shaft 15 by a pin 14. I will assume that this shaft rotates constantly in the direction indicated by the arrow in Fig. 1. A clutch plate 6 is located within the drum 12 and is secured to a shaft 9 by means of a pin 10. The periphery of clutch plate 6 is provided with a plurality of triangular notches 16 in each of which is located a roller 1. Each roller is acted upon by a spring 2 which is seated in a hole in the clutch plate and which tends to force the roller outwardly so that it will wedge between the clutch plate 6 and the drum 12 and thus clutch the two together. To disengage the clutch there is provided a disk 8, loosely mounted on the hub 6ᵃ of clutch plate 6 and carrying a number of projecting pins 7, which are adapted to force the rollers out of wedging positions. The clutch is controlled by a pawl 3 which in turn is operated by a magnet 18 and an arm 17. Rigidly fixed in pawl 3 is a cam pin 4 (see Fig. 5), which pin passes through a hole 13 in the clutch disk 8, and is held in place by a collar 20. One end of cam pin 4 is cut away on a longitudinal plane passing through the axis of the pin, thus forming a plane surface 5 which coacts with a radial surface 19 on plate 6 in a manner hereinafter explained.

In Fig. 4, the arm 17 is drawn by magnet 18 out of the path of pawl 3 so that the latter is unrestrained. The springs 2, acting through the rollers 1, have moved the pins 7 and disk 8 with relation to plate 6 so that the surface 5 of cam pin 4 is flat on the radial surface 19 on plate 6. The pins 7 are then so far advanced in the notches 16 that the rollers 1 are in wedging position, so that the plate 6 is caused to rotate with drum 12. The disk 8 obviously rotates also.

When now magnet 18 is deënergized, arm 17 will be drawn by spring 21 into the path of pawl 3, and when the pawl is arrested by this arm it will be swung in an arc around the axis of pin 4 because of the momentum of disk 8. This swing of the pawl and of pin 4 causes the latter to swing around the edge 5ᵃ as an axis, thereby moving the disk 8 in such direction with relation to the plate 6 that the pins 7 move the rollers 1 out of wedging position, thereby disengaging the plate 6 from the drum 12. This movement of the rollers and consequent compression of springs 2 is assisted by the momentum of plate 6, and in fact the momentum of this plate is absorbed by the compression of these springs. The parts of the clutch then are in the positions in which they are shown in Fig. 1. During the disengagement of the clutch as just explained, it will be seen that while the pawl 3 swings through a considerable angle, there is a comparatively small movement of the disk 8 relative to plate 6, this being due to the relation between the radius of pin 4 and the distance from the axis of this pin to the lip 3ᵃ of the pawl. The disengagement of the clutch is, therefore, gradual and without shock. During the process of disengagement, the springs 2 are compressed, and since these springs are mounted in clutch plate 6, the reaction of the springs against rollers 1 and pins 7 tends to cause the plate 6 to rotate in the reverse direction. To check this reverse rotation, I provide a single tooth ratchet 22 fixed to the shaft 9 and adapted to be engaged by a pawl 23 due to the action of a spring 24. The pawl 23 is so adjusted as to engage the tooth of the ratchet at the point at which the energy of the rotating parts has been absorbed by the springs 2. While the clutch is disengaged, therefore, the springs 2 are held under compression by ratchet 22, so that when pawl 3 is again released the rollers 1 are driven into wedging position by these springs with considerable force so that the engagement of the clutch is quick and positive.

Owing to the relation pointed out hereinbefore between the radius of pin 4 and the radius from the axis of this pin to the lip 3$^a$, a comparatively small force on the lip 3$^a$ will exert a comparatively great force on the plate 6 and, therefore, on the springs 2. For this reason I am enabled to make the springs 2 comparatively powerful and yet to control them by a comparatively small pressure on lip 3$^a$, that is, by using a magnet 18 which consumes a comparatively small amount of energy. A further advantage is that the pawl 3 can be made very small, so that the force of inertia to be overcome by the springs to engage the clutch is very slight. By using powerful springs 2, I insure quick and positive engagement of the clutch as pointed out hereinbefore.

Clutches embodying my invention are particularly well adapted for use in printing telegraph apparatus, such for example as in receivers of the type shown and described in an application filed by Lloyd V. Lewis in the United States Patent Office on April 16, 1914, Serial No. 832,252, although clutches embodying my invention are not limited to this particular adaptation.

Although I have shown and described only one form of clutch embodying my invention, it is understood that various changes and modifications may be made therein within the scope of the appended claims without departing from the spirit and scope of my invention.

Having thus described my invention, what I claim is:

1. A clutch comprising two concentrically mounted rotatable members, one of said members having recesses in the surface adjacent the other member said recesses forming wedge-shaped openings between the contiguous surfaces of said members, locking members located in said wedge-shaped openings, springs attached to one rotatable member for biasing said locking members into wedging positions between the two rotatable members, a third rotatable member having projections adapted to drive the locking members out of wedging positions against the action of said springs, and a lever device for causing sufficient relative movement of said third rotatable member and of the rotatable member to which said springs are attached to move the locking members out of locking position.

2. A clutch comprising two concentrically mounted rotatable members, one of said members having recesses in the surface adjacent the other member said recesses forming wedge-shaped openings between the contiguous surfaces of said members, locking members located in said wedge-shaped openings, springs attached to one rotatable member for biasing said locking members into wedging positions between the two rotatable members, a third rotatable member having projections adapted to drive the locking members out of wedging positions against the action of said springs, a lever device for causing sufficient relative movement of said third rotatable member and of the rotatable member to which said springs are attached to move the locking members out of locking position, and means for preventing rebound of the rotatable member to which the springs are attached.

3. A clutch comprising a drum, a plate located within the drum and movable with relation thereto and having recesses in its periphery, locking members located in said recesses, springs fixed to said plate and adapted to press said locking members into wedging positions between the plate and the drum, a disk mounted to rotate with relation to the plate, said disk having projections adapted to force the locking members out of wedging positions, a cam pin journaled in said disk and adapted to shift the disk with respect to the plate, a pawl fixed to said cam pin and projecting therefrom, and a member movable into and out of the path of said pawl.

4. A clutch comprising a drum, a plate located within the drum and movable with relation thereto and having recesses in its periphery, locking members located in said recesses, springs fixed to said plate and adapted to press said locking members into wedging positions between the plate and the drum, a disk mounted to rotate with relation to the plate, said disk having projections adapted to force the locking members out of wedging positions, a cam pin journaled in said disk and having a substantially plane surface parallel to the axis of the pin, said plate having a substantially radial surface adapted to coact with the plane surface on the cam pin, a pawl fixed to the said cam pin and projecting therefrom, and a member movable into and out of the path of said pawl.

5. A clutch comprising a drum, a plate located within the drum and movable with relation thereto and having recesses in its periphery, locking members located in said recesses, springs fixed to said plate and adapted to press said locking members into wedging positions between the plate and the drum, a disk mounted to rotate with relation to the plate, said disk having projections adapted to force the locking members out of wedging positions, a cam pin journaled in said disk and adapted to shift the disk with respect to the plate, a pawl fixed to said cam pin and projecting therefrom, a member movable into and out of the path of said pawl, the effective radius of said pawl being greater than the effective radius of said cam pin whereby a comparatively slight force exerted by said movable member on the pawl causes the exertion of a considerable force on said springs.

6. A clutch comprising two concentrically mounted rotatable members, one of which rotates constantly and the other of which is to be intermittently connected therewith, the latter member having recesses in the surface adjacent the other member which recesses form wedge-shaped openings between the contiguous surfaces of the two members, locking members located in said openings and biased to wedge between the two members, a third rotatable member having projections adapted to move and hold said locking members out of wedging positions, and a lever device for causing sufficient relative movement of the third rotatable member and the intermittently operated member to move the locking members out of locking positions.

In testimony whereof I affix my signature in presence of two witnesses.

WILLIAM H. MURSCH.

Witnesses:
A. HERMAN WEGNER.
R. L. KISTLER.